Patented Nov. 16, 1937

2,099,242

UNITED STATES PATENT OFFICE 2,099,242

PACKING COMPOSITION

Hugh T. Stewart, Palmyra, N. Y., assignor to The Garlock Packing Company, Palmyra, N. Y., a corporation of New York No Drawing. Application September 26, 1935, Serial No. 42,282

1 Claim. (Cl. 106—7.6)

My present invention relates to mechanical packings containing metal in finely divided form, and aims to provide certain improvements in such packings.

Heretofore so-called bulk packing compositions consisting of intermixtures of fibers, lubricants, metals, and a binding medium such as rubber, gums, waxes, resins, and the like, have been known and used. In these packings the metals most frequently employed have been lead, antimony, copper, and certain alloys of said metals. On account of the high specific gravity of these metals and alloys (lead 11.34; antimony 6.69; copper 8.89) they present comparatively small volume ratios to their density and weight. Even in finely divided form the dispersion ratios of these metals are very low, and hence large quantities are required in the mixtures to realize their desired or intended functions. Moreover, the majority of packing compositions of this general character use rubber as the binding medium for the various components thereof, and the use of said metals in this connection has been objectionable for various reasons. For example, the presence of antimony retards and often prevents the vulcanization of the rubber by selectively combining with the sulphur required for vulcanization; copper in contact with rubber is well known as a "rubber poison" and functions to greatly modify the properties of the rubber, often completely destroying its cohesion or binding power. Both lead and antimony also exhibit toxic effects on the individuals handling these metals,—lead causing a systematic toxicity, and antimony causing functional disorders and dermatitis.

The foregoing and other objectionable characteristics of the metals heretofore employed in packing compositions, I overcome by the use of aluminum in powdered or finely divided form. Aluminum is inexpensive and exhibits no detrimental action or toxic effects on individuals. It does not affect the vulcanization of rubber, and hence admirably lends itself to use of moldable packings. Its low specific gravity (2.70) permits the use of greatly lessened weight quantities to achieve equal volume quantities, thus resulting in lighter weight packings and consequently in a lowering of the cost thereof. Aluminum is also relatively unaffected by elevated temperatures, is capable of reduction to minute particle sizes, and an abundant supply thereof is available at costs lower than any of the so-called non-ferrous metals calculated to a volumetric basis. Primarily, finely divided metal is used in packings for the purpose of covering the surfaces of the harsh mineral or vegetable fibers, for reducing their wearing effect when in contact with moving parts of mechanism, and in view of the great covering power of finely divided aluminum, its use for this particular purpose is distinctly advantageous. Furthermore, metallic aluminum is relatively inert chemically, and will not readily enter into chemical reaction with materials with which it may come in contact when incorporated in a packing. Hence, its properties permit of its use in packings adapted for use over the greatest possible range of application.

Examples of packing compositions containing aluminum which I have found capable of a wide range of usefulness, in approximately their percentage compositions, are as follows:

Example 1

| | Per cent |
|---|---|
| Compounded rubber | 6.98 |
| Cotton oil | 9.30 |
| Asbestos fibres | 37.21 |
| Powdered aluminum | 18.60 |
| Powdered graphite | 27.91 |
| | 100.00 |

Example 2

| | Per cent |
|---|---|
| Alpha-polymer of chloroprene | 7.33 |
| S. A. E. 20 oil | 4.89 |
| Asbestos fibres | 29.26 |
| Powdered aluminum | 14.64 |
| Powdered graphite | 43.88 |
| | 100.00 |

Example 3

| | Per cent |
|---|---|
| Alpha-polymer of chloroprene | 12.5 |
| S. A. E. 20 oil | 10.0 |
| Asbestos fibres | 25.0 |
| Powdered aluminum | 15.0 |
| Powdered graphite | 37.5 |
| | 100.0 |

In the foregoing specific examples it will be noted that no compounding materials are mentioned as being added to either the rubber or the polychloroprene, but in practice such compounding materials will be used as preferred. For example, in compounding rubber, sulphur and other compounding ingredients may be used; in compounding the polychloroprene, magnesium oxide, diphenylguanidine, wood resin, zinc oxide, or any other desirable compounding ingredients may be used.

In practice, one mode of procedure in forming the packing composition according to my invention is as follows: The binding material, namely, rubber, polychloroprene, or other gums or waxes, are first thoroughly compounded on a mixing mill and dispersed in a suitable solvent such as naphtha. The dispersed compounded binding material is then placed in a suitable mixing apparatus and the other constituent materials of the packing, namely, the oil, asbestos fibres, powdered aluminum and powdered graphite, are added and the mixing continued until the mix becomes a homogeneous, dough-like, plastic mass.

The plastic mass may be molded or otherwise shaped to the required form, depending upon the desired shapes of the packings required, the volatile solvent evaporated therefrom, and the molded packings then heat-treated to vulcanize or stabilize the binding material.

The powdered aluminum used in the packings of my present invention is primarily for the purpose of covering the surfaces of the fibre constituent of the packings for reducing the wearing effect thereof when in contact with the moving parts of the mechanism, and although I have given only three specific examples of packing compositions employing powdered aluminum, it will be appreciated that various changes in proportions and equivalents of the component materials of the packing may be made by those skilled in the art, depending upon the desired characteristics of the final product. Hence, I do not wish to be limited to the specific examples hereinbefore given, nor to the specific mode of procedure in forming the packing, since these too may be varied without departing from the spirit of the invention.

What I claim is:

A packing material for industrial use, having the following approximate composition:

| | Per cent |
|---|---|
| Vulcanized binding material | 7.0–12.5 |
| Lubricating oil | 5.0–10.0 |
| Asbestos fibres | 25.0–37.0 |
| Powdered aluminum | 14.5–18.5 |
| Powdered graphite | 28.0–44.0 |

HUGH T. STEWART.